United States Patent [19]

Pineau

[11] Patent Number: 4,549,326

[45] Date of Patent: Oct. 29, 1985

[54] STREET SWEEPER WITH ELEVATOR CONVEYER ADJUSTABLE IN HEIGHT WITH RESPECT TO THE GROUND

[75] Inventor: Jean Pineau, Suresnes, France

[73] Assignee: Le Materiel de Voirie, Argenteuil, France

[21] Appl. No.: 676,581

[22] Filed: Nov. 30, 1984

[30] Foreign Application Priority Data

Dec. 5, 1983 [FR] France ................. 83 19388

[51] Int. Cl.⁴ .............................................. E01G 1/02
[52] U.S. Cl. ........................................ 15/84; 280/718
[58] Field of Search ..................................... 15/82–87, 15/340; 280/704, 718

[56] References Cited

U.S. PATENT DOCUMENTS 4,171,551 10/1979 Hildebrand et al. ................ 15/84

FOREIGN PATENT DOCUMENTS 2502660 10/1982 France ................................ 15/84
1407614 9/1975 United Kingdom .................. 15/84

*Primary Examiner*—Edward L. Roberts

[57] ABSTRACT

A street sweeper comprising a frame adapted for travel over the ground and having at least two transversely spaced wheels, a spring suspension means mounted between each wheel and the frame, a rubbish receptacle mounted on the frame, an elevating conveyor fixed to the frame and having a lower end situated in the region of the two wheels, therebetween, and an upper end situated above the receptacle, and an elongated pick-up rotary brush extending transversally adjacent to the lower end of the elevating conveyor for sweeping the rubbishes on the ground and projecting them into transporting elements of the elevating conveyor, an actuating means associated to each spring suspension means and connected on the one hand to the frame and on the other to a spring of the corresponding spring suspension means, and which, in a first position, compresses the spring to its maximum static load and, in a second position, leaves the spring free of strain, said elevating conveyor being fixed to the frame in a position such that, when the actuating means is in its first position, the lower end of the elevating conveyor is at a predetermined level above the ground, which is smaller than the level thereof when said actuating means is in its second position.

5 Claims, 7 Drawing Figures

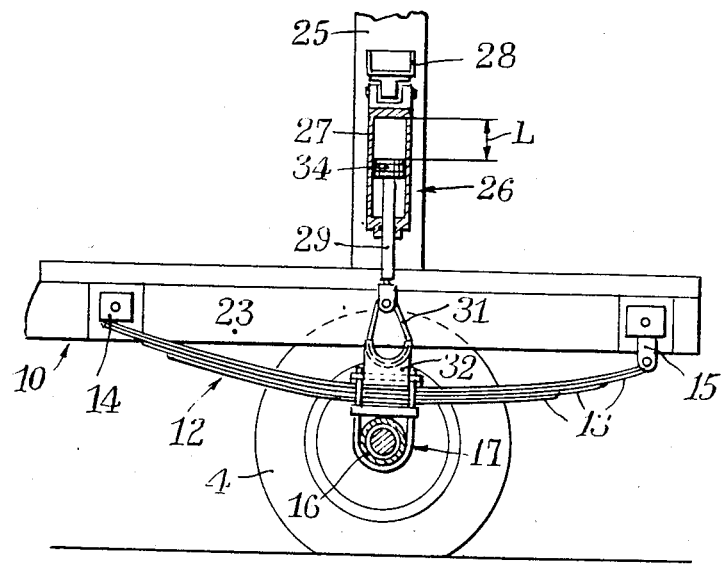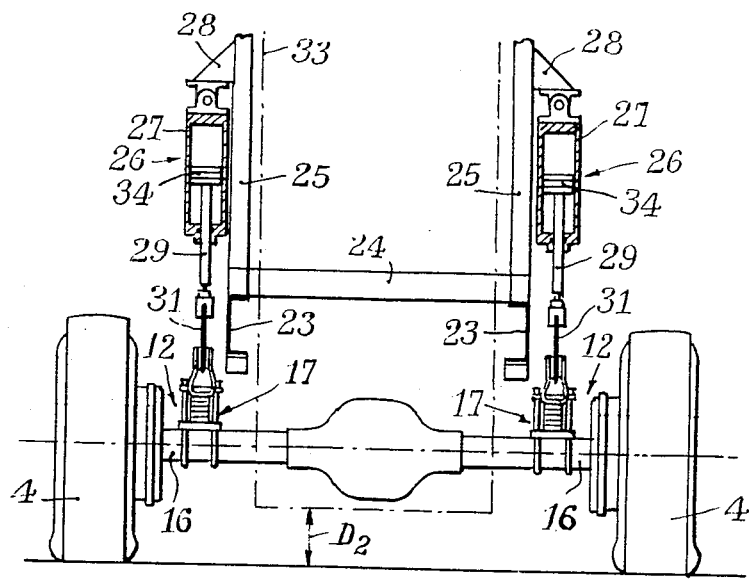

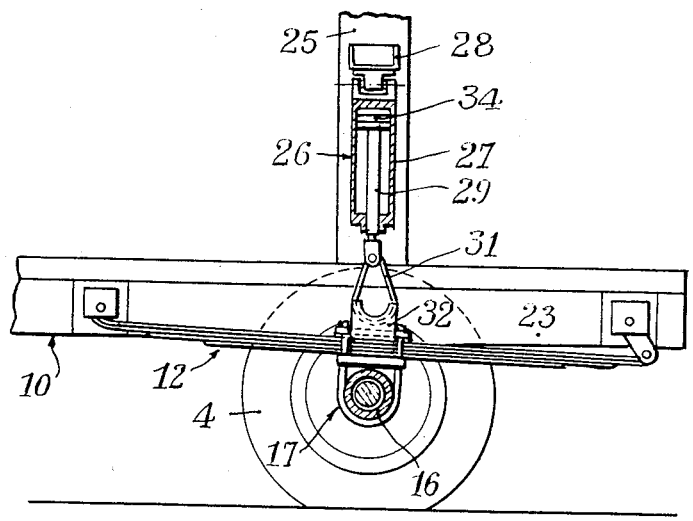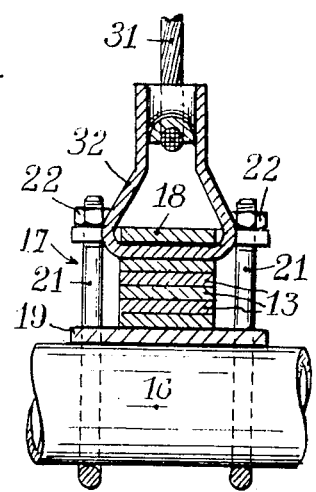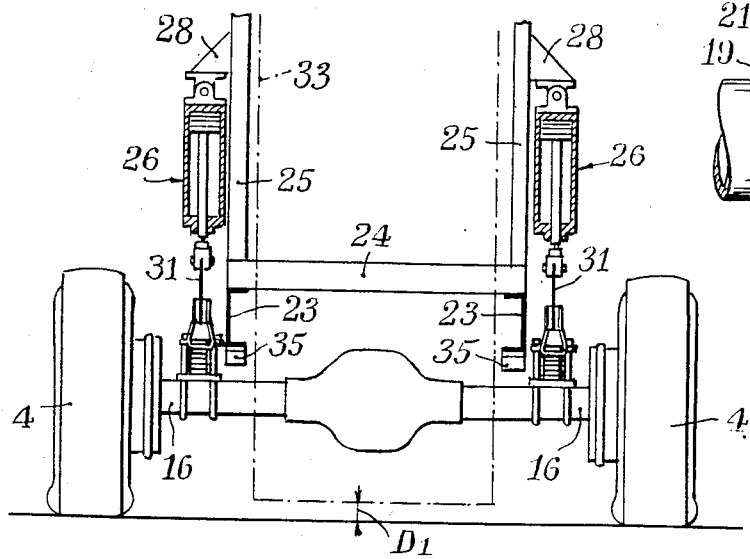

STREET SWEEPER WITH ELEVATOR CONVEYER ADJUSTABLE IN HEIGHT WITH RESPECT TO THE GROUND

BACKGROUND OF THE INVENTION

1. Field of the Invention

The present invention relates to a street sweeper comprising a frame adapted for travelling over the ground and having at least two transversely spaced wheels, a spring suspension means mounted between each wheel and the frame, a rubbish receptacle mounted on the frame, an elevating conveyor mounted on the frame and having a lower end situated in the region of the two wheels, therebetween, and an upper end situated above the receptacle, and an elongated pick-up rotary broom or rotary brush extending transversally adjacent to the lower end of the elevating conveyor for sweeping the rubbishes on the ground and projecting them into transporting elements (buckets, cleats or vanes) of the elevating conveyor.

2. Description of the Prior Art

The efficiency of collecting rubbish, dirt or refuse by the elevating conveyor depends, to a large part, on the distance between the ground and the transporting elements of the elevating conveyor, when these elements are situated at the lowest point of their travel, and on the constancy of this distance.

From the collecting efficiency point of view, this distance must be as small as possible, but a sufficient clearance from the ground must be maintained so as to avoid any sudden contact between the transporting elements of the elevating conveyor and the ground due to possible irregularities in the street surface or due to the action or depression of the spring suspension means of the wheels (generally the rear wheels) as a consequence of said irregularities.

To overcome this problem, it is known either to use a carrier vehicle not having any rear wheel spring suspension means (or having a suspension with very small flexibility), or to use a carrier vehicle having a rear wheel spring suspension means and an elevating conveyor having an auxiliary frame which is pivotable vertically with respect to the main frame of the carrier vehicle between an upper position for a transport mode and a lower position for a sweeping mode, said auxiliary frame being pivoted to its lower position in response to the actuation of actuating means coupled thereto, and lock out means responsive to the actuation of said actuating means to lock out the spring suspension means when the auxiliary frame of the elevating conveyor is in its lower position for the sweeping mode (U.S. Pat. No. 4,171,551).

The first solution offers the advantage of simplicity, but it does not give the operator a confortable drive during both transport and sweeping modes, and it does not allow standard trucks to be used as carrier vehicles for the rear suspension springs thereof are too flexible. This solution means that a specially designed carrier vehicle must be provided for the street sweeper.

With the second solution (U.S. Pat. No. 4,171,551) a standard truck can be used as carrier vehicle, but it leads to a heavy and costly design to allow and to cause the auxiliary frame of the elevating conveyor to pivot vertically with respect to the main frame of the truck.

It is also known to lock out the suspension springs on some machines or trucks carrying equipments such as, for instance, hydraulic shovels, excavators, cranes, extension ladders, which require very high stability in operation. In these machines the suspension springs are locked out in a position corresponding either to their minimum load or to their maximum load by means which prevent any action of the springs (see for instance German Pat. Nos. 1,530,917 and 1,802,830 and U.S. Pat. No. 2,997,342). However in this case, the purpose of locking out the springs is not to maintain the work equipment at an optimum predetermined distance from the ground but to give to the machine a stable base with respect to the ground.

The object of the present invention is to overcome the above mentioned problem, in the case where a standard truck is used as carrier vehicle, without it being necessary to mount the auxiliary frame of the elevating conveyor for vertical sliding with respect to the main frame of the truck.

SUMMARY OF THE INVENTION

The street sweeper of the present invention is characterized in that, to each spring suspension means, is associated an actuating means which is connected on the one hand to the frame and on the other to a spring of the corresponding spring suspension means and which, in a first position, compresses said spring up to its maximum static load and, in a second position, leaves the spring free of strain, the elevating conveyor being fixed to the frame in a position such that, when the actuating means is in its first position, the lower end of the elevating conveyor is at a predetermined level above the ground, which is smaller than the level thereof when the actuating means is in its second position.

Thus, for the transport mode of operation of the street sweeper, the actuating means associated with each suspension means is set to its second position, thereby allowing the suspension means to operate normally with its original flexibility, so as to smooth out bumps or other irregularities in the street surface. On the other hand, when the street sweeper is in its sweeping mode of operation for collecting rubbish, the actuating means associated with the suspension means is set in its first position and, therefore, the lower end of the elevating conveyor is at the optimum level with respect to the ground, while still providing the suspension with some flexibility which is nevertheless appreciably less than in the case where the springs are not compressed.

BRIEF DESCRIPTION OF THE DRAWINGS

Other features and advantages of the present invention will appear in the following description with reference to the accompanying drawings in which:

FIGS. 5 and 6 are views corresponding to views 3 and 4, respectively, but showing the suspension means in a second position, and FIG. 7 is a cross sectional view on a larger scale showing a detail of the suspension means shown in FIGS. 3 to 6.

DESCRIPTION OF THE PREFERRED EMBODIMENT

Figure 1:
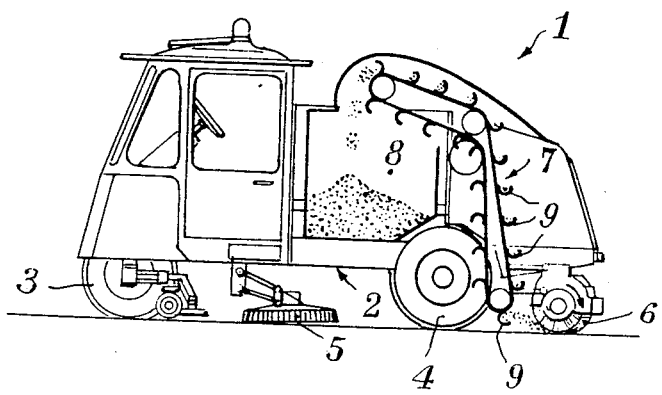
FIG. 1 is a side elevation view showing a street sweeper of the prior art having no spring suspension means or spring suspension means having very low flexibility.

The self propelled street sweeper 1 shown in FIG. 1 comprises a frame 2 equipped with a front wheel 3 and two rear wheels 4, so that it may travel over the ground under the action of an engine not shown. Two lateral rotary brushes 5, circular in shape, and a rotary brush 6, substantially cylindrical in shape, are mounted under frame 2 in a conventional arrangement, brush 6 being situated at the rear of the street sweeper and extending substantially in a transverse direction. Brushes 5 and 6 in combination with an elevating conveyor 7 having buckets, cleats or vanes as transporting elements, form all together means for picking up the refuses or rubbishes on the ground and for loading them into a receptacle 8 mounted on frame 2.

In operation, brush 6 throws the rubbishes into the buckets 9 (or onto cleats or vanes) of the elevating conveyor 7, the lower end of which must be as close as possible to the ground for the collecting of rubbish to be efficient.

In FIGS. 3 to 6 a part of the frame 10 of a standard truck has been shown, each rear wheel 4 of which is equipped with a spring suspension means 12; as shown, each suspension means 12 may be formed by a conventional leaf spring suspension comprising a stack of leaf springs 13, the ends of which are attached in a known way at 14 and 15 to the frame 10, and which are attached in their median part to an axle 16 supporting the wheels 4 by means of a clamping device 17. As best shown in FIG. 7, the clamping device 17 comprises an upper plate 18 and a lower plate 19 between which the spring leaves 13 are clamped by means of two U-shaped tie rods 21 which are threaded at both ends. Each tie rod 21 passes around the lower part of axle 16 and through holes or notches in plates 18 and 19, and clamping nuts 22 are screwed on the threaded ends of each rod 21.

As it can be clearly seen in FIGS. 4 and 6, frame 10 comprises two transversally spaced longitudinal members 23, formed for example by channel section beams, and cross beams 24 having their ends connected to said longitudinal members 23. Two uprights 25 are fixed to the longitudinal members 23, respectively, in a vertical plane containing the axis of axle 16.

To each suspension means 12 is associated a hydraulic actuator 26 the cylinder 27 of which is connected to a bracket 28 fixed to one of the uprights 25, and the piston rod 29 of which is connected to the corresponding suspension means 12 by a flexible link 31. Link 31 may be formed for example by a steel cable loop which is attached to the lower end of the piston rod 29 and which passes through the loop of a stirrup piece 32 the lower part of which is clamped with the spring leaves 13 between plates 18 and 19 of the clamping device 17 as shown in FIG. 7.

Figure 2:
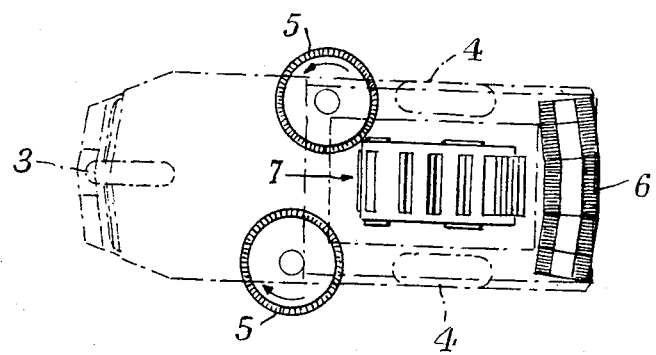
FIG. 2 is a top view showing the main sweeping and collecting means of the collecting street sweeper of FIG. 1, FIGS. 3 and 4 are a side elevation view and a rear view, respectively, showing the modifications made according to the invention to the suspension means of a standard truck used as carrier vehicle for the sweeping and collecting equipment of a street sweeper, the suspension means being shown in a first position.

Frame 10 is equipped with rotary brushes, with an elevating conveyor and with a receptacle similar to those which have been shown in FIGS. 1 and 2, although not shown in FIGS. 3 to 6 for the sake of simplicity and clarity of the drawings. In FIGS. 4 and 6 only the contour 33 of the elevating conveyor has been shown with a dot dash line.

At rest or when the street sweeper is travelling over the road in a transport mode, the hydraulic actuators 26 are not actuated and pistons 34 thereof are substantially half way between the ends of cylinders 27. In this case, the spring leaves 13 of each suspension meahs 12 are simply compressed by the weight of the vehicle, and each suspension means 12 keeps all its original flexibility.

On the other hand, when the street sweeper is in its sweeping mode of operation, the lower chamber of the cylinder of each actuator 26 is supplied with pressurized fluid from a conventional hydraulic unit (not shown) usually already existing in such street sweepers. The stroke L of piston 34 of each actuator 26 is chosen so that, when piston 34 is in abutment against the upper end of cylinder 27, the spring leaves 13 of suspension means 12 are compressed to the maximum static load specified by the constructor of the vehicle. It will be noted that, under these conditions, the flexible loop 31 nevertheless leaves free part of the stroke of the spring leaves 13 corresponding to the dynamic operation of suspension means 12 (shocks due to irregularities in the street surface). Thus both the reliability of the electric, pneumatic, hydraulic equipment and components etc . . . mounted on the street sweeper and the comfort of the driver are maintained. In addition, this free available stroke allows easy positioning of an overload detector formed for example by a conventional contactor or a proximity detector which trips an alarm for the driver as soon as the nominal load of the spring leaves has been reached.

The elevating conveyor is fixed to frame 10 in a position such that, when the actuators 26 are actuated (FIGS. 5 and 6), the lower end of the elevating conveyor is at a predetermined distance $D_1$ from the ground, this distance being chosen so as to ensure optimum picking-up of the rubbishes which are forwardly by the rear rotary transverse brush of the sweeper. As shown in FIG. 6 stop members 35 are fixed to the longitudinal members 23 above axle 16 at a distance therefrom which is slightly smaller than distance $D_1$ when actuators 26 are actuated. Thus, when the elevating conveyor is in its lower position (FIGS. 4 and 6), its lower end cannot knock against the ground during dynamic operation of the suspension means 12.

When actuators 26 are not actuated (FIGS. 3 and 4), the lower end of the elevating conveyor is at a distance $D_2$ from the ground, which is substantially greater than distance $D_1$, the difference between these two distances being equal to the stroke L of the pistons 34 of the actuators 26. In this case, distance $D_2$ is sufficiently great for the lower end of the elevating conveyor not to knock against the ground during dynamic operation of the suspension means 12.

It goes without saying that the embodiment of the present invention which has been described above has been given purely by way of example and is in no wise limiting, and that numerous modifications may be readily made by a man skilled in the art, without departing from the scope and spirit of the invention as defined in the following claims. Thus, more particularly, instead of being disposed vertically, actuators 26 may be disposed horizontally. In this case, the piston rod of each actuator is connected to the corresponding suspension means 12 either by means of a flexible link, such as a cable, passing around a pulley or by means of a L-shaped pivoting lever and a flexible link. Moreover, instead of using hydraulic actuators 26, other actuating devices may be used such for example as compressed air actuators or screw actuators or winches. Furthermore, instead of steel cable loops 31, chains or any other flexible links may be used, or else slide rods or any other lost motion device providing the suspension means with freedom of movement. Moreover, although the present invention has been more particularly described with reference to a vehicle each rear wheel of which is equipped with a spring leaf suspension means, the present invention is also applicable in the case where the rear wheels are equipped with a helical spring suspension means. Finally, although the present invention has been more particularly described in connection with a self propelled street sweeper, the invention is also applicable to a street sweeper the brushes, elevating conveyor and, possibly the rubbish receptacle, of which are carried by a trailer adapted to be hitched to a tractor vehicle.

What is claimed is:

1. A street sweeper comprising a frame adapted for travel over the ground and having at least two transversely spaced wheels, a spring suspension means mounted between each wheel and the frame, a rubbish receptacle mounted on the frame, an elevating conveyor fixed to the frame and having a lower end situated in the region of the two wheels, therebetween, and an upper end situated above the receptacle, and an elongated pick-up rotary brush extending transversally adjacent to the lower end of the elevating conveyor for sweeping the rubbishes on the ground and projecting them into transporting elements of the elevating conveyor, an actuating means associated to each spring suspension means and connected on the one hand to the frame and on the other to a spring of the corresponding spring suspension means, and which, in a first position, compresses the spring to its maximum static load and, in a second position, leaves the spring free of strain, said elevating conveyor being fixed to the frame in a position such that, when the actuating means is in its first position, the lower end of the elevating conveyor is at a predetermined level above the ground, which is smaller than the level thereof when said actuating means is in its second position.

2. The street sweeper as claimed in claim 1, wherein said actuating means is connected to the spring through a flexible link.

3. The street sweeper as claimed in claim 1, wherein said actuating means is connected to the spring through a lost motion coupling.

4. The street sweeper as claimed in claim 2, wherein said actuating means comprises a hydraulic actuator having a cylinder connected to the frame and a piston rod connected to said spring.

5. The street sweeper as claimed in claim 4, wherein each spring suspension means comprises a stack of spring leaves which are attached, in their median part, to an axle supporting said wheels by means of a clamping device, and wherein a stirrup piece is attached to the spring leaf stack by means of said clamping device and the piston rod of said actuator is connected to said stirrup piece by said flexible link, said flexible link being a steel cable loop.

* * * * *